(12) United States Patent
Hiramatsu

(10) Patent No.: US 7,935,018 B2
(45) Date of Patent: May 3, 2011

(54) AUTOMATIC TRANSMISSION

(75) Inventor: Takeo Hiramatsu, Nagaokakyo (JP)

(73) Assignee: Jatco Ltd, Fuji-shi (JP)

( * ) Notice: Subject to any disclaimer, the term of this patent is extended or adjusted under 35 U.S.C. 154(b) by 321 days.

(21) Appl. No.: 12/352,840

(22) Filed: Jan. 13, 2009

(65) Prior Publication Data
US 2009/0221395 A1     Sep. 3, 2009

(30) Foreign Application Priority Data
Feb. 29, 2008    (JP) ................................ 2008-049028

(51) Int. Cl.
*F16H 3/62*      (2006.01)

(52) U.S. Cl. ...................................... 475/269; 475/279

(58) Field of Classification Search .................. 475/269, 475/279, 290, 296
See application file for complete search history.

(56) References Cited

U.S. PATENT DOCUMENTS

| | | | |
|---|---|---|---|
| 2005/0130791 A1* | 6/2005 | Raghavan et al. | 475/296 |
| 2006/0128518 A1* | 6/2006 | Bucknor et al. | 475/279 |
| 2006/0166780 A1* | 7/2006 | Raghavan et al. | 475/296 |

FOREIGN PATENT DOCUMENTS

JP     2004-176765 A    6/2004

* cited by examiner

*Primary Examiner* — Edwin A. Young
(74) *Attorney, Agent, or Firm* — Global IP Counselors, LLP

(57) ABSTRACT

An automatic transmission is provided with three planetary gear units and five friction elements that establish at least six forward speeds and one reverse speed by engaging different combinations of three out of five friction elements simultaneously. In the automatic transmission, an output shaft is always connected to a first ring gear of the first planetary gear unit. A second ring gear of the second planetary gear unit is always fixed. A first carrier of the first planetary gear unit and a third ring gear of the third planetary gear unit are connected together to form a first rotating member. A second sun gear of the second planetary gear unit and a third carrier of the third planetary gear unit are connected together to form a second rotating member.

12 Claims, 3 Drawing Sheets

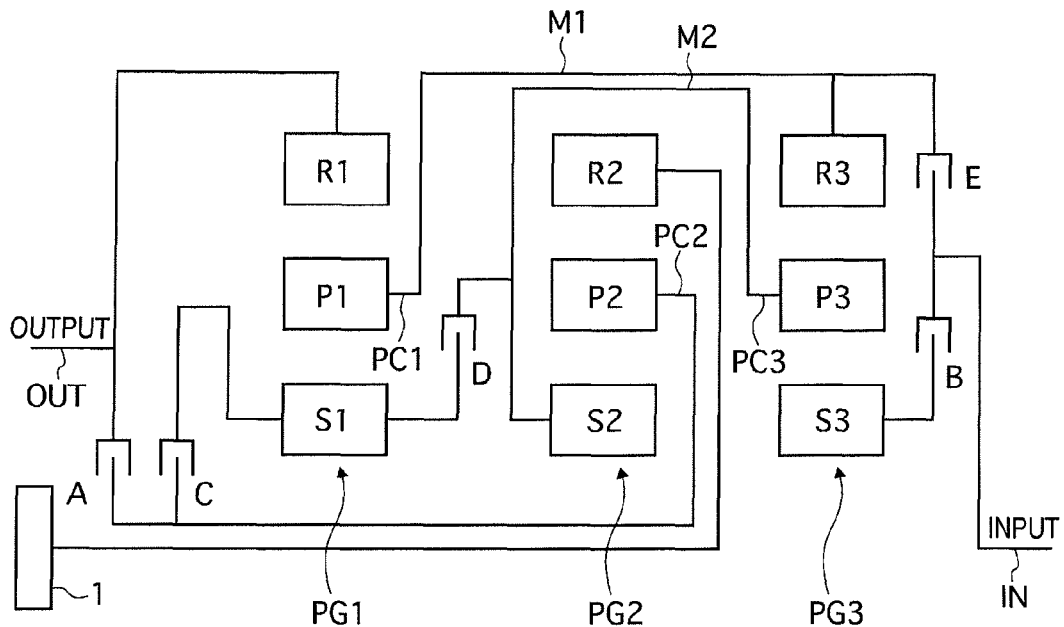

Fig. 1

$\rho_1 = Z_{S1}/Z_{R1} = 0.3$  $\rho_2 = Z_{S2}/Z_{R2} = 0.6$  $\rho_3 = Z_{S3}/Z_{R3} = 0.3$

| GEAR | A | B | C | D | E | REDUCTION RATIO FORMULA: $i = n_t/n_2$ | REDUCTION RATIO | 1/REDUCTION RATIO |
|---|---|---|---|---|---|---|---|---|
| FIRST SPEED | O | O | O | | | $i_1 = (1+\rho_3+\rho_2\rho_3)/(\rho_2\rho_3)$ | 8.222 | 0.122 |
| SECOND SPEED | O | O | | O | | $i_2 = 1+(1+\rho_3+\rho_1\rho_3)/(\rho_2\rho_3(1+\rho_1))$ | 6.940 | 0.144 |
| THIRD SPEED | O | O | | | O | $i_3 = (1+\rho_2)/\rho_2$ | 2.667 | 0.375 |
| FOURTH SPEED | O | | | O | O | $i_4 = (\rho_1+\rho_2+\rho_1\rho_2)/(\rho_2(1+\rho_1))$ | 1.385 | 0.722 |
| FIFTH SPEED | | O | | O | O | $i_5 = 1$ | 1.000 | 1.000 |
| SIXTH SPEED | | O | O | | O | $i_6 = (1+\rho_2)/(1+\rho_1+\rho_2)$ | 0.842 | 1.188 |
| SEVENTH SPEED | | O | O | O | | $i_7 = 1/(1+\rho_1)$ | 0.769 | 1.300 |
| REVERSE | | O | O | O | | $i_R = -1/(\rho_3(1+\rho_1))$ | -2.564 | -0.168 |

RATIO COVERAGE: 10.69  (R/1) = 0.32

Fig. 2

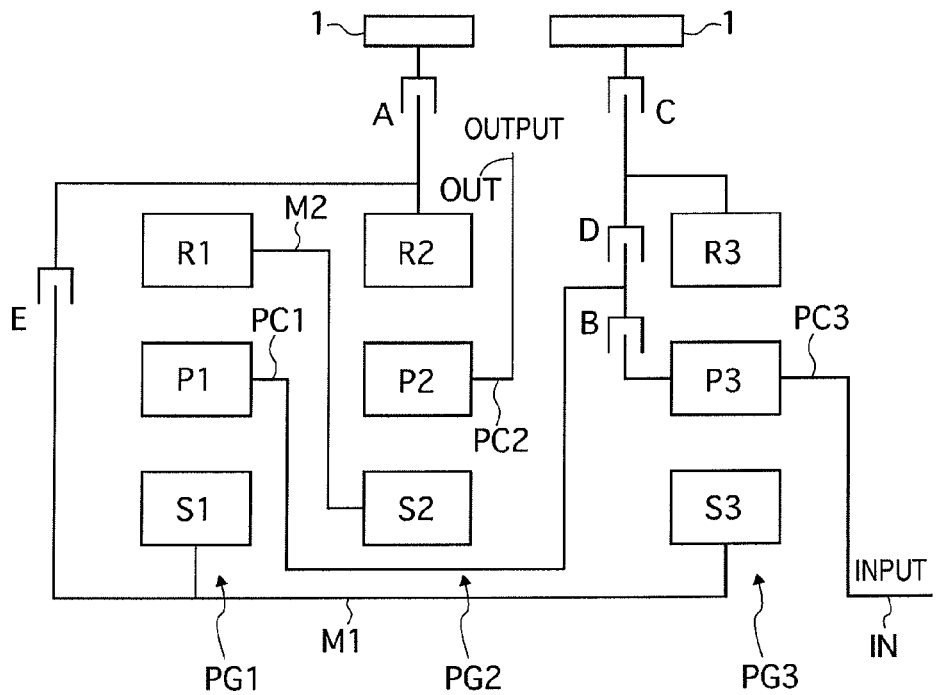

Fig. 3

$\rho_1 = Z_{S1}/Z_{R1} = 0.3$  $\rho_2 = Z_{S2}/Z_{R2} = 0.65$  $\rho_3 = Z_{S3}/Z_{R3} = 0.65$

| GEAR | A | B | C | D | E | REDUCTION RATIO FORMULA: $i = n_t/n_2$ | REDUCTION RATIO | 1/REDUCTION RATIO |
|---|---|---|---|---|---|---|---|---|
| FIRST SPEED | O | O | O | | | $i_1 = \rho_3(1+\rho_2)/(\rho_2(\rho_3-\rho_1))$ | 4.714 | 0.212 |
| SECOND SPEED | O | O | | O | | $i_2 = (1+\rho_2)/\rho_2$ | 2.538 | 0.394 |
| THIRD SPEED | O | O | | | O | $i_3 = (1+\rho_2)/(\rho_2(1+\rho_1))$ | 1.953 | 0.512 |
| FOURTH SPEED | O | | | O | O | $i_4 = (1+\rho_2)/(\rho_2(1+\rho_1)(1+\rho_3))$ | 1.183 | 0.845 |
| FIFTH SPEED | | O | | O | O | $i_5 = 1$ | 1.000 | 1.000 |
| SIXTH SPEED | | O | O | O | | $i_6 = \rho_3(1+\rho_2)/(1+\rho_3-\rho_1\rho_2-\rho_1\rho_2\rho_3)$ | 0.807 | 1.239 |
| SEVENTH SPEED | | O | O | | O | $i_7 = \rho_3(1+\rho_2)/(1+\rho_3+\rho_2\rho_3-\rho_1\rho_2)$ | 0.571 | 1.751 |
| REVERSE | O | | O | O | | $i_R = -\rho_3(1+\rho_2)/(\rho_1\rho_2(1+\rho_3))$ | -3.333 | -0.300 |

RATIO COVERAGE: 8.25  (R/1)=0.71

Fig. 4

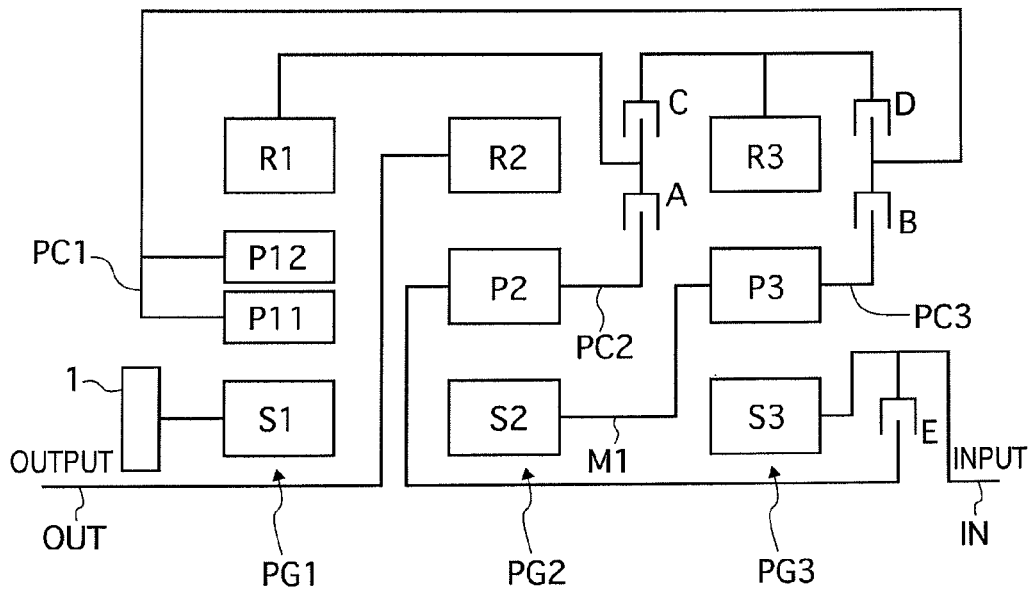

Fig. 5

$\rho_1 = Z_{S1}/Z_{R1} = -0.4$  $\rho_2 = Z_{S2}/Z_{R2} = 0.6$  $\rho_3 = Z_{S3}/Z_{R3} = 0.5$

| GEAR | A | B | C | D | E | REDUCTION RATIO FORMULA: $i = n_t / n_2$ | REDUCTION RATIO | 1/REDUCTION RATIO |
|---|---|---|---|---|---|---|---|---|
| FIRST SPEED | O | O | O | | | $i_1 = (\rho_3 - \rho_1)/(\rho_3(1 + \rho_1 + \rho_1\rho_2))$ | 5.000 | 0.200 |
| SECOND SPEED | O | O | | O | | $i_2 = 1/(1 + \rho_1 + \rho_1\rho_2)$ | 2.778 | 0.375 |
| THIRD SPEED | O | O | | | O | $i_3 = (1 + \rho_1)/(1 + \rho_1 + \rho_1\rho_2)$ | 1.667 | 0.600 |
| FOURTH SPEED | O | | | O | O | $i_4 = (1 + \rho_1(1 + \rho_3))/(1 + \rho_1 + \rho_3 + \rho_1\rho_2 + \rho_1\rho_3)$ | 1.364 | 0.733 |
| FIFTH SPEED | | O | | O | O | $i_5 = 1$ | 1.000 | 1.000 |
| SIXTH SPEED | | O | O | | O | $i_6 = (\rho_3 - \rho_1)/(\rho_3 - \rho_1 - \rho_1\rho_2)$ | 0.789 | 1.267 |
| SEVENTH SPEED | | | O | O | O | $i_7 = (1 + \rho_3)/(1 + \rho_2 + \rho_3)$ | 0.714 | 1.401 |
| REVERSE | O | | O | O | | $i_R = -(1 + \rho_3)/(\rho_2 \rho_3)$ | -5.000 | -0.200 |

RATIO COVERAGE: 7.00   (R/1) = 1.00

Fig. 6

AUTOMATIC TRANSMISSION

CROSS-REFERENCE TO RELATED APPLICATIONS

This application claims priority to Japanese Patent Application No. 2008-049028, filed on Feb. 29, 2008. The entire disclosure of Japanese Patent Application No. 2008-049028 is hereby incorporated herein by reference.

BACKGROUND OF THE INVENTION

1. Field of the Invention

The present invention generally relates to an automatic transmission. More specifically, the present invention relates to a stepped automatic transmission that can be used as a transmission in a vehicle.

2. Background Information

In the past, automatic transmissions have been proposed in which three groups of planetary gears and five friction elements are used to establish seven forward speeds (gears). For example, automatic transmissions of this type are disclosed in Japanese Laid-Open Patent Publication No. 2004-176765.

In view of the above, it will be apparent to those skilled in the art from this disclosure that there exists a need for an improved automatic transmission. This invention addresses this need in the art as well as other needs, which will become apparent to those skilled in the art from this disclosure.

SUMMARY OF THE INVENTION

In the automatic transmission disclosed in Japanese Laid-Open Patent Publication No. 2004-176765, two friction elements simultaneously are needed to be engaged to achieve each of the forward speeds (gears). In view of the state of the known technology, an automatic transmission is proposed that reduces the portion of the total number of friction elements that are in a released state. Consequently, the drag torque that occurs when the vehicle is driven can be reduced and the fuel economy can be improved.

In accordance with one aspect of the present invention, an automatic transmission is provided that basically comprises an input shaft, an output shaft, a first planetary gear unit, a second planetary gear unit, a third planetary gear unit, a first friction element, a second friction, a third friction element, a fourth friction and a fifth friction element. The first planetary gear unit includes a first sun gear, a first carrier supporting a first pinion in meshed engagement with the first sun gear, and a first ring gear in meshed engagement with the first pinion, with the output shaft always being connected to the first ring gear to rotate therewith. The second planetary gear unit includes a second sun gear, a second carrier supporting a second pinion in meshed engagement with the second sun gear, and a second ring gear in meshed engagement with the second pinion, with the second ring gear being always fixed. The third planetary gear unit includes a third sun gear, a third carrier supporting a third pinion in meshed engagement with the third sun gear, and a third ring gear in meshed engagement with the third pinion, with the first carrier and the third ring gear being connected together as a unit to form a first rotating member and the second sun gear and the third carrier being connected together as a unit to form a second rotating member. The first friction element is arranged to selectively connect the first ring gear and the second carrier together. The second friction element is arranged to selectively connect the intake shaft and the third sun gear together. The third friction element is arranged to selectively connect the first sun gear and the second carrier together. The fourth friction element is arranged to selectively connect the first sun gear and the second rotating member together. The fifth friction element is arranged to selectively connect the first rotating member and the input shaft together. The first to fifth friction elements are operatively arranged with respect to the first, second and third planetary gear units to selectively establish at least six forward speeds and one reverse speed by combining simultaneous engagement of three out of the first to fifth friction elements for transmitting torque from the input shaft to the output shaft.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1 is a simplified schematic view (skeleton diagram) of an automatic transmission in accordance with a first embodiment;

FIG. 2 is an example of a clutch engagement operating chart showing which friction elements are engaged in order to establish (select) each speed (gear) and the corresponding speed reduction ratio obtained in the automatic transmission according to the first embodiment;

FIG. 3 is a simplified schematic view (skeleton diagram) of an automatic transmission in accordance with a second embodiment;

FIG. 4 is an example of a clutch engagement operating chart showing which friction elements are engaged in order to establish (select) each speed (gear) and the corresponding speed reduction ratio obtained in the automatic transmission according to the second embodiment;

FIG. 5 is a simplified schematic view (skeleton diagram) of an automatic transmission in accordance with a third embodiment; and FIG. 6 is an example of a clutch engagement operating chart showing which friction elements are engaged in order to establish (select) each speed (gear) and the corresponding speed reduction ratio obtained in the automatic transmission according to the third embodiment.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Referring initially to FIG. 1, a stepped automatic transmission is schematically illustrated in accordance with a first embodiment. FIG. 2 is an example of a clutch engagement operating chart showing which friction elements are engaged in order to establish (select) each speed (gear) and the corresponding speed reduction ratio obtained in the automatic transmission according to the first embodiment. First, the main features of the automatic transmission will be described.

As shown in FIG. 1, the gear train of the automatic transmission according to the first embodiment comprises three single-pinion type planetary gear units, namely, a first planetary gear unit PG1, a second planetary gear unit PG2, and a third planetary gear unit PG3. The first planetary gear unit PG1 has a first sun gear S1, a first ring gear R1, and a first pinion gear P1 in meshed engagement with the first sun gear S1 and the first ring gear R1. The second planetary gear unit PG2 has a second sun gear S2, a second ring gear R2, and a second pinion gear P2 in meshed engagement with the second sun gear S2 and the second ring gear R2. The third planetary gear unit PG3 has a third sun gear S3, a third ring gear R3, and a third pinion gear P3 in meshed engagement with the third sun gear S3 and the third ring gear R3. The first, second, and third pinion gears P1, P2, and P3 are rotatably supported on first, second, and third carriers PC1, PC2, and PC3, respectively.

The second ring gear R2 is always fixed to a transmission case 1. An output shaft OUT is always coupled to the first ring gear R1. The first carrier PC1 and the third ring gear R3 are always connected and constitute a first rotating member M1. The second sun gear S2 and the third carrier PC3 are always connected and constitute a second rotating member M2.

The automatic transmission is provided with five friction elements serving as clutches, namely, a first friction element A, a second friction element B, a third friction element C, a fourth friction element D, and a fifth friction element E. The first friction element A is provided between the first ring gear R1 and the second carrier PC2 and serves to selectively couple the first ring gear R1 to the second carrier PC2. The second friction element B is provided between the input shaft IN and the third sun gear S3 and serves to selectively couple the input shaft IN to the third sun gear S3. The third friction element C is provided between the first sun gear S1 and the second carrier PC2 and serves to selectively couple the first sun gear S1 to the second carrier PC2. The fourth friction element D is provided between the first sun gear S1 and the second rotating member M2 formed by the second sun gear S2 and the third carrier PC3, and serves to selectively couple the first sun gear S1 to the second rotary member M2. The fifth friction element E is provided between the input shaft IN and the first rotating member M1 formed by the first carrier PC1 and the third ring gear R3, and serves to selectively couple the input shaft IN and the first rotating member M1.

The output shaft OUT is provided with an output gear and the like and transmits rotational driving force to a drive wheel via a differential gear and a drive shaft (not shown). In the first embodiment, the output shaft OUT is blocked by the transmission case 1 and, thus, the automatic transmission is applicable to a front-wheel-drive vehicle.

The coupling (engagement) states of the friction elements used to select each speed (gear) are described using the clutch engagement operating chart shown in FIG. 2 (gearshift control unit). A circle mark (○) in the table indicates engagement, and a blank space indicates release.

Forward movement will first be described. A first speed is established by engaging the first friction element A, the second friction element B, and the third friction element C. A second speed is established by engaging the first friction element A, the second friction element B, and the fourth friction element D. A third speed is established by engaging the first friction element A, the second friction element B, and the fifth friction element E. A fourth speed is established by engaging the first friction element A, the fourth friction element D, and the fifth friction element E. A fifth speed is established by engaging the second friction element B, the fourth friction element D, and the fifth friction element E. A sixth speed is established by engaging the second friction element B, the third friction element C, and the fifth friction element E. A seventh speed is established by engaging the third friction element C, the fourth friction element D, and the fifth friction element E. A reverse speed (gear) is established by engaging the second friction element B, the third friction element C, and the fourth friction element D.

A specific example of the speed reduction ratios obtained in the first embodiment is described next using FIG. 2. The example will be described with reference to a case where the gear ratio of the first planetary gear unit PG1 is $\rho_1=Z_{S1}/Z_{R1}=0.30$, the gear ratio of the second planetary gear unit PG2 is $\rho_2=Z_{S2}/Z_{R2}=0.60$, and the gear ratio of the third planetary gear unit PG3 is $\rho_3=Z_{S3}/Z_{R3}=0.30$. Here, $Z_{S1}$, $Z_{S2}$, $Z_{S3}$, $Z_{R1}$, $Z_{R2}$, and $Z_{R3}$ indicate the number of teeth of each respective gear.

The speed reduction ratio $i_1$ of the first forward speed is expressed by the formula $i_1=(1+\rho_3+\rho_2\rho_3)/\rho_2\rho_3$. When a specific numeric value is substituted, the reduction ratio $i_1$ of the first forward speed is $i_1=8.222$ and the inverse of the reduction ratio is 0.122.

The speed reduction ratio $i_2$ of the second forward speed is expressed by the formula $i_2=1+(1+\rho_3+\rho_1\rho_3)/(\rho_2\rho_3(1+\rho_1))$. When a specific numeric value is substituted, the reduction ratio $i_2$ of the second forward speed is $i_2=6.940$ and the inverse of the reduction ratio is 0.144.

The speed reduction ratio $i_3$ of the third forward speed is expressed by the formula $i_3=(1+\rho_2)/\rho_2$. When a specific numeric value is substituted, the reduction ratio $i_3$ of the third forward speed is $i_3=2.667$ and the inverse of the reduction ratio is 0.357.

The speed reduction ratio $i_4$ of the fourth forward speed is expressed by the formula $i_4=(\rho_1+\rho_2+\rho_1\rho_2)/(\rho_2(1+\rho_1))$. When a specific numeric value is substituted, the reduction ratio $i_4$ of the fourth forward speed is $i_4=1.385$ and the inverse of the reduction ratio is 0.722.

The speed reduction ratio $i_5$ of the fifth forward speed is expressed by the formula $i_5=1.0$. Even without substituting a specific numeric value, it is apparent that the speed reduction ratio $i_5$ of the fifth forward speed is $i_5=1.000$ and the inverse speed reduction ratio is 1.000.

The speed reduction ratio $i_6$ of the sixth forward speed is expressed by the formula $i_6=(1+\rho_2)/(1+\rho_1+\rho_2)$. When a specific numeric value is substituted, the reduction ratio $i_6$ of the sixth forward speed is $i_6=0.842$ and the inverse of the reduction ratio is 1.188.

The speed reduction ratio $i_7$ of the seventh forward speed is expressed by the formula $i_7=1/(1+\rho_1)$. When a specific numeric value is substituted, the reduction ratio $i_7$ of the seventh forward speed is $i_7=0.769$ and the inverse of the reduction ratio is 1.300.

The speed reduction ratio $i_R$ of the reverse speed is expressed by the formula $i_R=-1/(\rho_3(1+\rho_1))$. When a specific numeric value is substituted, the speed reduction ratio $i_R$ of the reverse speed is $i_R=-2.564$, and the inverse speed reduction ratio is −0.168

Effects of the First Embodiment

Effects with Respect to the Number of Engaged Friction Elements

Since each speed (gear) is established by engaging three friction elements simultaneously, the automatic transmission reduces the portion of the total number of friction elements that are in a released state. Consequently, the drag torque that occurs when the vehicle is driven (traveling) can be reduced and the fuel economy can be improved.

Effects Regarding the Entire Structure

With the first embodiment, it is possible to obtain an automatic transmission having seven forward speeds and one reverse speed that can achieve appropriate speed reduction ratios with a simple structure having a small number of constituent elements (i.e., three simple planetary gear units and five friction elements). Additionally, such an automatic transmission can be made compact in size.

Effects of Using of Three Simple Planetary Gear Units

In comparison with using a double pinion, configuring the transmission from three simple planetary gear units enables worsening of gear noise to be suppressed. In addition, since there is no need to reduce the pinion diameter, the durability of the gear can be increased.

Effects with Respect to the Number of Friction Elements whose Engagement State is Changed during Gear Shifting (i) Torque control and the engagement/release timing of friction elements during gear shifting becomes complicated when, for example, one or more friction elements are released and two or more friction elements are engaged, or when two or more friction elements are released and one or more friction elements are engaged. Thus, from the view point of preventing gear shifting control from being complicated, it is preferable to release a single friction element and to engage another single friction element. In other words, it is preferable to avoid multiple changes of the engagement states of the friction elements. In the first embodiment, the first friction element A and the second friction element B remain engaged during shifting among the first to third forward speeds, the first friction element A and the fifth friction element E remain engaged during shifting between the third forward speed and the fourth forward speed, the fourth friction element D and the fifth friction element E remain engaged during shifting between the fourth forward speed and the fifth forward speed, the second friction element B and the fifth friction element E remain engaged during shifting between the fifth forward speed and the sixth forward speed, and the third friction element C and the fifth friction element E remain engaged during shifting between the sixth forward speed and the seventh forward speed. In other words, shifting from any gear to an adjacent gear among the first to seventh forward speeds (gears) is accomplished by a change of friction element engagement states in which a single friction element is released and another single friction element is engaged. Control during gear shifting is thereby prevented from becoming complicated.

Effects Regarding Layout (i) The automatic transmission according to the first embodiment does not have three layers of coupling members present in an area at the outside perimeter of the three planetary gear units, as shown in the skeleton diagram in FIG. 1. Lubricating oil is thus less likely to accumulate, and fuel efficiency is improved by reducing the friction.

(ii) Seven forward speeds and one reverse speed can be achieved with three simple planetary gear units and five friction elements while the members that pass through the internal circumference of the three planetary gear units have at most a biaxial structure. Consequently, the degree of design freedom is enhanced because the dimensions of the sun gears are unrestricted and there is a large degree of freedom regarding the gear ratios of the planetary gears.

In the structure of the first embodiment, it is also possible to arrange a one-way clutch in parallel with the third friction element C. It is preferable to provide a one-way clutch OWC for the first speed in order to simplify the control executed when shifting from the first speed to the second speed, between which the torque difference is large, and to prevent an excessive feeling of engine braking during normal driving.

In order to achieve these objectives, the first speed one-way clutch OWC needs to be provided in parallel with the friction element that is released when the automatic transmission shifts from the first forward speed to the second forward speed. In the first embodiment, that friction element is the third friction element C. The third friction element C is a clutch for selectively connecting the first sun gear S1 and the second carrier PC2 together. When the transmission shifts from the first speed to the second speed, the rotational speed of the first sun gear S1 increases more than the rotational speed of the second carrier PC2. Consequently, in order to arrange a one-way clutch with respect to the third friction element C, it is necessary for a state in which the rotational speed of the second carrier PC2 is higher than the rotational speed of the first sun gear S1 to exist when the automatic transmission is in any of the speeds (gears) for which the third friction element C is released.

If the automatic transmission is configured such that the relationship between the aforementioned rotational speeds reverses while the automatic transmission is in any one of the aforementioned speeds (gear positions), then it will be necessary to add another friction element in series with the one-way clutch OWC to switch the one-way clutch OWC between an operating state and a non-operating state, thus causing the number of parts to increase and making the transmission less practical. Therefore, in the first embodiment, the relationship between the rotational speed of the second carrier PC2 and the rotational speed of the first sun gear S1 is such that in all speeds (gears) the rotational speed of the second carrier PC2 is smaller than the rotational speed of the first sun gear S1. As a result, it is acceptable to simply arrange the one-way clutch OWC in parallel with the third friction element C, thus avoiding a large increase in the number of parts. Additionally, the control logic can be simplified and a feeling of excessive engine braking can be prevented during normal driving.

Although the first embodiment is explained based on an automatic transmission configured to provide seven forward speeds, it is also acceptable to configure an automatic transmission according to the first embodiment that has six forward speeds selected as appropriate from among the seven speeds described above.

Second Embodiment

First, the constituent features of the automatic transmission will be described.

FIG. 3 is a skeleton diagram showing the gear shifting mechanism of a stepped automatic transmission according to a second embodiment, and FIG. 4 is an example of a clutch engagement operating chart showing which friction elements are engaged in order to establish (select) each speed (gear) and the corresponding speed reduction ratio obtained in the automatic transmission according to the second embodiment.

As shown in FIG. 3, the gear train of the automatic transmission according to the second embodiment comprises three single-pinion type planetary gear units, namely, a first planetary gear unit PG1, a second planetary gear unit PG2, and a third planetary gear unit PG3. The first planetary gear unit PG1 has a first sun gear S1, a first ring gear R1, and a first pinion gear P1 in meshed engagement with the first sun gear S1 and the first ring gear R1. The second planetary gear unit PG2 has a second sun gear S2, a second ring gear R2, and a second pinion gear P2 in meshed engagement with the second sun gear S2 and the second ring gear R2. The third planetary gear unit PG3 has a third sun gear S3, a third ring gear R3, and a third pinion gear P3 in meshed engagement with the third sun gear S3 and the third ring gear R3. The first, second, and third pinion gears P1, P2, and P3 are rotatably supported on first, second, and third carriers PC1, PC2, and PC3, respectively.

The first sun gear S1 and the third sun gear S3 are always connected and constitute a first rotating member M1. The first ring gear R1 and the second sun gear S2 are always connected and constitute a second rotating member M2. An input shaft IN is always coupled to the third carrier PC3. An output shaft OUT is always coupled to the second carrier PC2.

The automatic transmission is provided with two brakes, namely a first friction element A and a third friction element C, and three clutches, namely second, fourth, and fifth friction elements B, D, and E. The first friction member A is provided between a transmission case 1 and the second ring gear R2 and serves to selectively stop rotation of the second ring gear R2. The second friction member B is provided between the first carrier PC1 and the third carrier PC3 and serves to selectively couple the first carrier PC1 to the third carrier PC3. The third friction element C is provided between the transmission case 1 and the third ring gear R3 and serves to selectively stop rotation of the third ring gear R3. The fourth friction member D is provided between the first carrier PC1 and the third ring gear R3 and serves to selectively couple the first carrier PC1 to the third ring gear R3. The fifth friction element E is provided between the second ring gear R2 and a first rotating member M1 comprising the first sun gear S1 and the second sun gear S2, and serves to selectively couple the second ring gear R2 to the first rotating member M1.

The output shaft OUT is provided with an output gear and the like and transmits rotational driving force to a drive wheel via a differential gear and a drive shaft (not shown). In the second embodiment, the output shaft OUT is blocked by other members and, thus, the automatic transmission is applicable to a front-wheel-drive vehicle.

The coupling (engagement) states of the friction elements used to select each speed (gear) are described using the clutch engagement operating chart shown in FIG. 4 (gearshift control unit). A circle mark (○) in the table indicates engagement, and a blank space indicates release.

Forward movement will first be described. A first speed is established by engaging the first friction element A, the second friction element B, and the third friction element C. A second speed is established by engaging the first friction element A, the second friction element B, and the fourth friction element D. A third speed is established by engaging the first friction element A, the second friction element B, and the fifth friction element E. A fourth speed is established by engaging the first friction element A, the fourth friction element D, and the fifth friction element E. A fifth speed is established by engaging the second friction element B, the fourth friction element D, and the fifth friction element E. A sixth speed is established by engaging the third friction element C, the fourth friction element D, and the fifth friction element E. A seventh speed is established by engaging the second friction element B, the third friction element C, and the fifth friction element E. A reverse speed (gear) is established by engaging the first friction element A, the third friction element C, and the fourth friction element D.

A specific example of the speed reduction ratios obtained in the second embodiment is described next using FIG. 4. The example will be described with reference to a case where the gear ratio of the first planetary gear unit PG1 is $\rho_1 = Z_{S1}/Z_{R1} = 0.30$, the gear ratio of the second planetary gear unit PG2 is $\rho_2 = Z_{S2}/Z_{R2} = 0.65$, and the gear ratio of the third planetary gear unit PG3 is $\rho_3 = Z_{S3}/Z_{R3} = 0.65$. Here, $Z_{S1}$, $Z_{S2}$, $Z_{S3}$, $Z_{R1}$, $Z_{R2}$, and $Z_{R3}$ indicate the number of teeth of each respective gear.

The speed reduction ratio $i_1$ of the first forward speed is expressed by the formula $i_1 = (1+\rho_2)/(\rho_2(\rho_3-\rho_1))$. When a specific numeric value is substituted, the reduction ratio $i_1$ of the first forward speed is $i_1 = 4.714$ and the inverse of the reduction ratio is 0.212.

The speed reduction ratio $i_2$ of the second forward speed is expressed by the formula $i_2 = (1+\rho_2)/\rho_2$. When a specific numeric value is substituted, the reduction ratio $i_2$ of the second forward speed is $i_2 = 2.538$ and the inverse of the reduction ratio is 0.394.

The speed reduction ratio $i_3$ of the third forward speed is expressed by the formula $i_3 = (1+\rho_2)/(\rho_2(1+\rho_1))$. When a specific numeric value is substituted, the reduction ratio $i_3$ of the third forward speed is $i_3 = 1.953$ and the inverse of the reduction ratio is 0.512.

The speed reduction ratio $i_4$ of the fourth forward speed is expressed by the formula $i_4 = (1+\rho_2)/(\rho_2(1+\rho_1)(1+\rho_3))$. When a specific numeric value is substituted, the reduction ratio $i_4$ of the fourth forward speed is $i_4 = 1.183$ and the inverse of the reduction ratio is 0.845.

The speed reduction ratio $i_5$ of the fifth forward speed is expressed by the formula $i_5 = 1.0$. Even without substituting a specific numeric value, it is apparent that the speed reduction ratio $i_5$ of the fifth forward speed is $i_5 = 1.000$ and the inverse speed reduction ratio is 1.000.

The speed reduction ratio $i_6$ of the sixth forward speed is expressed by the formula $i_6 = (1+\rho_2)/(1+\rho_3-\rho_1\rho_2-\rho_1\rho_2\rho_3)$. When a specific numeric value is substituted, the reduction ratio $i_6$ of the sixth forward speed is $i_6 = 0.807$ and the inverse of the reduction ratio is 1.239.

The speed reduction ratio $i_7$ of the seventh forward speed is expressed by the formula $i_7 = (1+\rho_2)/(1+\rho_3-\rho_2\rho_3-\rho_1\rho_2)$. When a specific numeric value is substituted, the reduction ratio $i_7$ of the seventh forward speed is $i_7 = 0.571$ and the inverse of the reduction ratio is 1.751.

The speed reduction ratio $i_R$ of the reverse speed is expressed by the formula $i_R = -\rho_3(1+\rho_2)/(\rho_1\rho_2(1+\rho_3))$. When a specific numeric value is substituted, the speed reduction ratio $i_R$ of the reverse speed is $i_R = -3.333$, and the inverse speed reduction ratio is $-0.300$ Effects of the Second Embodiment Effects with Respect to the Number of Engaged Friction Elements Since each speed (gear) is established by engaging three friction elements simultaneously, the automatic transmission reduces the portion of the total number of friction elements that are in a released state. Consequently, the drag torque that occurs when the vehicle is driven (traveling) can be reduced and the fuel economy can be improved.

Effects Regarding the Entire Structure

With the second embodiment, it is possible to obtain an automatic transmission having seven forward speeds and one reverse speed that can achieve appropriate speed reduction ratios with a simple structure having a small number of constituent elements (i.e., three simple planetary gear units and five friction elements). Additionally, such an automatic transmission can be made compact in size.

Effects of Using of Three Simple Planetary Gear Units

In comparison with using a double pinion, configuring the transmission from three simple planetary gear units enables worsening of gear noise to be suppressed. In addition, since there is no need to reduce the pinion diameter, degradation of the gear durability can be suppressed.

Effects Regarding the Ratio Coverage of Forward Speeds

The ratio coverage (size of range of gear ratios) of the forward speeds is defined to be the value obtained when the reduction ratio of the lowest gear is divided by the reduction ratio of the highest gear. The larger this value is, the higher the degree of freedom is with respect to setting the gear ratio of each of the forward speeds. The specific numerical values in presented in the second embodiment are a speed reduction ratio of 4.714 for the first forward speed and a speed reduction ratio of 0.571 for the seventh forward speed. Therefore, the ratio coverage for speeds 1 to 7 is 8.25, and sufficient ratio coverage can be ensured. Consequently, the automatic transmission is also useful as a transmission for a vehicle installed with a diesel engine as a power source (a diesel engine has a smaller range of rotational speeds than a gasoline engine and a lower torque than a gasoline engine having the same displacement).

If the gear ratios of the lower speeds (gears) are large in relation to the ratio coverage, then the torque transmitted to the final gear will be large. Consequently, it will be necessary to strengthen the automatic transmission and the propeller shaft and the size of the vehicle as a whole will increase. In other words, for a given range coverage, it is preferable for the lowest gear ratio not to be excessively large. An automatic transmission in accordance with the second embodiment is contrived such that the gear ratio of the lowest gear is not excessively large and is capable of securing a sufficient range coverage.

Effects with Respect to the Number of Friction Elements whose Engagement State is Changed During Gear Shifting (i) Torque control and the engagement/release timing of friction elements during gear shifting becomes complicated when, for example, one or more friction elements are released and two or more friction elements are engaged, or when two or more friction elements are released and one or more friction elements are engaged. Thus, from the view point of preventing gear shifting control from being complicated, it is preferable to release a single friction element and to engage another single friction element. In other words, it is preferable to avoid multiple changes of the engagement states of the friction elements. In the second embodiment, the first friction element A and the second friction element B remain engaged during shifting among the first to third forward speeds, the first friction element A and the fifth friction element E remain engaged during shifting between the third forward speed and the fourth forward speed, the fourth friction element D and the fifth friction element E remain engaged during shifting between the fifth forward speed and the sixth forward speed, and the third friction element C and the fifth friction element E remain engaged during shifting between the sixth forward speed and the seventh forward speed. In other words, shifting from any gear to an adjacent gear among the first to seventh forward speeds (gears) is accomplished by a change of friction element engagement states in which a single friction element is released and another single friction element is engaged. Control during gear shifting is thereby prevented from becoming complicated.

(ii) As indicated in (i) above, shifting from any gear to an adjacent gear can be accomplished by a change of friction element engagement states in which a single friction element is released and another single friction element is engaged. Additionally, with this embodiment, shifting from any gear to a gear two gears away (i.e., shifting in which an adjacent gear is skipped, such as shifting from the first forward speed to the third forward speed) can also accomplished releasing a single friction element and engaging and another single friction element. As a result, the controllability of the automatic transmission can be improved.

Effects Regarding Layout (i) The automatic transmission according to the second embodiment does not have three layers of coupling members present in an area at an outside perimeter of the three planetary gear units, as shown in the skeleton diagram in FIG. 3. Lubricating oil is thereby made less likely to accumulate, and fuel efficiency is improved by reducing the friction.

(ii) As is also shown in the schematic view according to FIG. 3, the rotating members that pass through the area at the outside perimeter of the planetary gear units are single-layered structures. In an automatic transmission, lubricating oil is constantly supplied to gears, bearings, and other rotating elements in order to provide cooling and lubrication. This lubrication is generally provided by centrifugal force from the axial center. If discharge of the lubricating oil along the outside circumference is impeded, then the temperature of the lubricating oil will rise and the durability of the friction elements, bearing members, and the like (not shown) will decline. In second embodiment, the rotating members that pass through the area at the outside perimeter of the planetary gear units are single-layered structures, as described above. Consequently, discharge of the lubricating oil is not impeded and durability is enhanced.

(iii) Seven forward speeds and one reverse speed can be achieved with three simple planetary gear units and five friction elements while the members that pass through the internal circumference of the three planetary gear units have at most a biaxial structure. Consequently, the degree of design freedom is enhanced because the dimensions of the sun gears are unrestricted and there is a large degree of freedom regarding the gear ratios of the planetary gears.

Effects Related to the Number of Friction Elements

Among the friction elements in the second embodiment, the first friction element A and the third friction element C act as brakes. In other words, by providing a brake, it is possible to suppress an increase in the number of seal rings and centrifugal cancellation mechanisms and to suppress an increase in the number of parts and the axial dimensions while improving fuel efficiency in comparison with a case in which the number of clutches is larger.

In the structure of the second embodiment, it is also possible to arrange a one-way clutch in parallel with the third friction element C. It is preferable to provide a one-way clutch OWC for the first speed in order to simplify the control executed when shifting from the first speed to the second speed—between which the torque difference is large—and to prevent an excessive feeling of engine braking during normal driving.

In order to achieve these objectives, the first speed one-way clutch OWC is provided in parallel with the friction element that is released when the automatic transmission shifts from the first forward speed to the second forward speed. In the second embodiment, that friction element is the third friction element C. The third friction element C is a brake serving to selectively fix the third ring gear R3 to the transmission case 1. When the transmission shifts from the first speed to the second speed, the third ring gear R3 rotates in a positive direction (same direction as the engine rotation). Consequently, in order to arrange a one-way clutch with respect to the third friction element C, it is necessary for the rotation direction of the third ring gear R3 to be positive during all of the gears for which the third friction element C is released.

If the automatic transmission is configured such that the rotation direction of the third ring gear R3 becomes negative while the automatic transmission is in any one of the aforementioned speeds, then it will be necessary to add another friction element in series with the one-way clutch OWC to switch the one-way clutch OWC between an operating state and a non-operating state, thus causing the number of parts to increase and making the transmission less practical. Therefore, in the second embodiment, the rotational direction of the third ring gear R3 is positive during all gears, i.e., the rotational direction of the third ring gear R3 is positive regardless of which speed is selected. As a result, it is acceptable to simply arrange the one-way clutch OWC in parallel with the third friction element C, thus avoiding a large increase in the number of parts. Additionally, the control logic can be simplified and a feeling of excessive engine braking can be prevented during normal driving.

Although the second embodiment is explained based on an automatic transmission configured to provide seven forward speeds, it is also acceptable to configure an automatic transmission according to the second embodiment that has six forward speeds selected as appropriate from among the seven speeds described above.

Third Embodiment

First, the main features of the automatic transmission will be described.

FIG. 5 is a skeleton diagram showing the gear shifting mechanism of a stepped automatic transmission according to a third embodiment, and FIG. 6 is an example of a clutch engagement operating chart showing which friction elements are engaged in order to establish (select) each speed (gear) and the corresponding speed reduction ratio obtained in the automatic transmission according to the third embodiment.

As shown in FIG. 5, the gear train of the automatic transmission according to the third embodiment comprises one double-pinion type planetary gear unit, namely a first planetary gear unit PG1, and two single-pinion type planetary gear units, namely, a second planetary gear unit PG2 and a third planetary gear unit PG3. The first planetary gear unit PG1 comprises a first sun gear S1, a first ring gear R1, a first inner pinion P11 arranged in meshed engagement with the first sun gear S1, and a first outer pinion P12 arranged in meshed engagement with the first inner pinion P11 and the first ring gear R1. The second planetary gear unit PG2 has a second sun gear S2, a second ring gear R2, and a second pinion gear P2 in meshed engagement with the second sun gear S2 and the second ring gear R2. The third planetary gear unit PG3 has a third sun gear S3, a third ring gear R3, and a third pinion gear P3 in meshed engagement with the third sun gear S3 and the third ring gear R3. The first inner pinion P11 and the first outer pinion P12 are rotatably supported on a first carrier PC1. The second and third pinion gears P2 and P3 are rotatably supported on second and third carriers PC2 and PC3, respectively.

The second sun gear S2 and the third carrier PC3 are always connected and constitute a first rotating member M1. An input shaft IN is always coupled to the third sun gear S3. An output shaft OUT is always coupled to the second ring gear R2. The first sun gear S1 is always fixed to a transmission case 1.

The automatic transmission is provided with five friction elements serving as clutches, namely, a first friction element A, a second friction element B, a third friction element C, a fourth friction element D, and a fifth friction element E. The first friction element A is provided between the first ring gear R1 and the second carrier PC2 and serves to selectively couple the first ring gear R1 and the second carrier PC2 together. The second friction element B is provided between the first carrier PC1 and a first rotating member M1 comprising the second sun gear S2 and the third carrier PC3, and serves to selectively couple the first carrier PC1 to the first rotating member M1. The third friction member C is provided between the first ring gear R1 and the third ring gear R3 and serves to selectively couple the first ring gear R1 to the third ring gear R3. The fourth friction member D is provided between the first carrier PC1 and the third ring gear R3 and serves to selectively couple the first carrier PC1 to the third ring gear R3. The fifth friction member E is provided between the second carrier PC2 and the third sun gear S3 and serves to selectively couple the second carrier PC21 to the third sun gear S3.

The output shaft OUT is provided with an output gear and the like and transmits rotational driving force to a drive wheel via a differential gear and a drive shaft (not shown). In the third embodiment, the output shaft OUT is not blocked by any other members and, thus, the automatic transmission is applicable to both front-wheel-drive vehicles and rear-wheel-drive vehicles.

The coupling (engagement) states of the friction elements used to select each speed (gear) are described using the clutch engagement operating chart shown in FIG. 6 (gearshift control unit). A circle mark (○) in the table indicates engagement, and a blank space indicates release.

Forward movement will first be described. A first speed is established by engaging the first friction element A, the second friction element B, and the third friction element C. A second speed is established by engaging the first friction element A, the second friction element B, and the fourth friction element D. A third speed is established by engaging the first friction element A, the second friction element B, and the fifth friction element E. A fourth speed is established by engaging the first friction element A, the fourth friction element D, and the fifth friction element E. A fifth speed is established by engaging the second friction element B, the fourth friction element D, and the fifth friction element E. A sixth speed is established by engaging the second friction element B, the third friction element C, and the fifth friction element E. A seventh speed is established by engaging the third friction element C, the fourth friction element D, and the fifth friction element E. A reverse speed (gear) is established by engaging the first friction element A, the third friction element C, and the fourth friction element D.

A specific example of the speed reduction ratios obtained in the third embodiment is described next using FIG. 6. The example will be described with reference to a case where the gear ratio of the first planetary gear unit PG1 is $\rho_1 = Z_{S1}/Z_{R1} = -0.40$, the gear ratio of the second planetary gear unit PG2 is $\rho_2 = Z_{S2}/Z_{R2} = 0.60$, and the gear ratio of the third planetary gear unit PG3 is $\rho_3 = Z_{S3}/Z_{R3} = 0.50$. Here, $Z_{S1}$, $Z_{S2}$, $Z_{S3}$, $Z_{R1}$, $Z_{R2}$, and $Z_{R3}$ indicate the number of teeth of each respective gear. The value of $\rho_1$ is negative because a double-pinion type planetary gear unit is used.

The speed reduction ratio $i_1$ of the first forward speed is expressed by the formula $i_1 = (\rho_3 - \rho_1)/(\rho_3(1+\rho_1+\rho_1\rho_2))$. When a specific numeric value is substituted, the reduction ratio $i_1$ of the first forward speed is $i_1 = 5.000$ and the inverse of the reduction ratio is 0.200.

The speed reduction ratio $i_2$ of the second forward speed is expressed by the formula $i_2 = 1/(1+\rho_1+\rho_1\rho_2)$ When a specific numeric value is substituted, the reduction ratio $i_2$ of the second forward speed is $i_2 = 2.778$ and the inverse of the reduction ratio is 0.375.

The speed reduction ratio $i_3$ of the third forward speed is expressed by the formula $i_3 = (1+\rho_1)/(1+\rho_1+\rho_1\rho_2)$. When a specific numeric value is substituted, the reduction ratio $i_3$ of the third forward speed is $i_3 = 1.667$ and the inverse of the reduction ratio is 0.600.

The speed reduction ratio $i_4$ of the fourth forward speed is expressed by the formula $i_4 = (1+\rho_1(1+\rho_3))/(1+\rho_1+\rho_3+\rho_1\rho_2+\rho_1\rho_3)$. When a specific numeric value is substituted, the reduction ratio $i_4$ of the fourth forward speed is $i_4 = 1.364$ and the inverse of the reduction ratio is 0.733.

The speed reduction ratio $i_5$ of the fifth forward speed is expressed by the formula $i_5=1.0$. Even without substituting a specific numeric value, it is apparent that the speed reduction ratio $i_5$ of the fifth forward speed is $i_5=1.000$ and the inverse speed reduction ratio is 1.000.

The speed reduction ratio $i_6$ of the sixth forward speed is expressed by the formula $i_6=(\rho_3-\rho_1)/(\rho_3-\rho_1-\rho_1\rho_2)$. When a specific numeric value is substituted, the reduction ratio $i_6$ of the sixth forward speed is $i_6=0.789$ and the inverse of the reduction ratio is 1.267.

The speed reduction ratio $i_7$ of the seventh forward speed is expressed by the formula $i_7=(1+\rho_3)/(1+\rho_2+\rho_3)$. When a specific numeric value is substituted, the reduction ratio $i_7$ of the seventh forward speed is $i_7=0.714$ and the inverse of the reduction ratio is 1.401.

The speed reduction ratio $i_R$ of the reverse speed is expressed by the formula $i_R=-(1+\rho_3)/(\rho_2\rho_3)$. When a specific numeric value is substituted, the speed reduction ratio $i_R$ of the reverse speed is $i_R=-5.000$, and the inverse speed reduction ratio is $-0.200$.

Effects of the Third Embodiment

Effects with Respect to the Number of Engaged Friction Elements

Since each speed (gear) is established by engaging three friction elements simultaneously, the automatic transmission reduces the portion of the total number of friction elements that are in a released state. Consequently, the drag torque that occurs when the vehicle is driven (traveling) can be reduced and the fuel economy can be improved.

Effects Regarding the Entire Structure

With the third embodiment, it is possible to obtain an automatic transmission having seven forward speeds and one reverse speed that can achieve appropriate speed reduction ratios with a simple structure having a small number of constituent elements (i.e., three planetary gear units and five friction elements). Additionally, such an automatic transmission can be made compact in size.

Effects Regarding the Ratio Coverage of Forward Speeds

The ratio coverage (size of range of gear ratios) of the forward speeds is defined to be the value obtained when the reduction ratio of the lowest gear is divided by the reduction ratio of the highest gear. The larger this value is, the higher the degree of freedom is with respect to setting the gear ratio of each of the forward speeds. The specific numerical values in presented in the second embodiment are a speed reduction ratio of 5,000 for the first forward speed and a speed reduction ratio of 0.714 for the seventh forward speed. Therefore, the ratio coverage for speeds 1 to 7 is 7.00, and sufficient ratio coverage can be ensured. Consequently, the automatic transmission is also useful as a transmission for a vehicle installed with a diesel engine as a power source (a diesel engine has a smaller range of rotational speeds than a gasoline engine and a lower torque than a gasoline engine having the same displacement).

If the gear ratios of the lower speeds (gears) are large in relation to the ratio coverage, then the torque transmitted to the final gear will be large. Consequently, it will be necessary to strengthen the automatic transmission and the propeller shaft and the size of the vehicle as a whole will increase. In other words, for a given range coverage, it is preferable for the lowest gear ratio not to be excessively large. An automatic transmission in accordance with the third embodiment is contrived such that the gear ratio of the lowest gear is not excessively large and is capable of securing a sufficient range coverage.

Effects Regarding the 1-R Ratio

In this embodiment, the ratio of the gear ratio of the reverse speed with respect to the gear ratio of the first forward speed (i.e., reverse speed gear ratio/forward first speed gear ratio, hereinafter called "1-R ratio") is 1. Consequently, the feeling of acceleration obtained with respect to a given depression amount of the accelerator pedal does not differ between the reverse speed and the first speed and any degradation of drivability that would result from such a difference can be avoided.

The 1-R ratio will now be explained in more detail. If the 1-R ratio cannot be set to an appropriate value, e.g., if the 1-R ratio is a small value, then the output torque obtained with a given accelerator position will differ greatly between the first forward speed and the reverse speed. When the feeling of vehicular acceleration obtained with respect to the depression amount of the accelerator differs greatly between driving forward and driving in reverse, the drivability is poor because the first forward speed and the reverse speed are both used when the vehicle is started into motion. Thus, the 1-R ratio has be adopted as one indicator of drivability.

Effects with Respect to the Number of Friction Elements whose Engagement State is Changed During Gear Shifting (i) Torque control and the engagement/release timing of friction elements during gear shifting becomes complicated when, for example, one or more friction elements are released and two or more friction elements are engaged, or when two or more friction elements are released and one or more friction elements are engaged. Thus, from the view point of preventing gear shifting control from being complicated, it is preferable to release a single friction element and to engage another single friction element. In other words, it is preferable to avoid multiple changes of the engagement states of the friction elements. In the first embodiment, the first friction element A and the second friction element B remain engaged during shifting among the first to third forward speeds, the first friction element A and the fifth friction element E remain engaged during shifting between the third forward speed and the fourth forward speed, the fourth friction element D and the fifth friction element E remain engaged during shifting between the fourth forward speed and the fifth forward speed, the second friction element B and the fifth friction element E remain engaged during shifting between the fifth forward speed and the sixth forward speed, and the third friction element C and the fifth friction element E remain engaged during shifting between the sixth forward speed and the seventh forward speed. In other words, shifting from any gear to an adjacent gear among the first to seventh forward speeds (gears) is accomplished by a change of friction element engagement states in which a single friction element is released and another single friction element is engaged. Control during gear shifting is thereby prevented from becoming complicated.

Effects Regarding Layout (i) In the automatic transmission according to the third embodiment, there are not three layers of coupling members present in an area at the outside perimeter of the three planetary gear units, as shown in the skeleton diagram in FIG. 5. Lubricating oil is thereby made less likely to accumulate, and fuel efficiency is improved by reducing the friction.

(ii) Seven forward speeds and one reverse speed can be achieved with three simple planetary gear units and five friction elements while the members that pass through the internal circumference of the three planetary gear units have a single-axis structure. Consequently, the degree of design freedom is enhanced because the dimensions of the sun gears are unrestricted and there is a large degree of freedom regarding the gear ratios of the planetary gears.

(iii) The automatic transmission according to the third embodiment is an automatic transmission in which input is made from one side of a planetary gear unit and output is made from another side. Therefore, the transmission can also be used in a front-wheel drive vehicle or a rear-wheel drive vehicle, and the range of applications of automatic transmissions can be expanded.

Although the third embodiment is explained based on an automatic transmission configured to provide seven forward speeds, it is also acceptable to configure an automatic transmission according to the second embodiment that has six forward speeds selected as appropriate from among the seven speeds described above.

GENERAL INTERPRETATION OF TERMS

In understanding the scope of the present invention, the term "comprising" and its derivatives, as used herein, are intended to be open ended terms that specify the presence of the stated features, elements, components, groups, integers and/or steps, but do not exclude the presence of other unstated features, elements, components, groups, integers and/or steps. The foregoing also applies to words having similar meanings such as the terms, "including", "having" and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An automatic transmission comprising:
an input shaft;
an output shaft;
a first planetary gear unit including a first sun gear, a first carrier supporting a first pinion in meshed engagement with the first sun gear, and a first ring gear in meshed engagement with the first pinion, with the output shaft always being connected to the first ring gear to rotate therewith;
a second planetary gear unit including a second sun gear, a second carrier supporting a second pinion in meshed engagement with the second sun gear, and a second ring gear in meshed engagement with the second pinion, with the second ring gear being always fixed;
a third planetary gear unit including a third sun gear, a third carrier supporting a third pinion in meshed engagement with the third sun gear, and a third ring gear in meshed engagement with the third pinion, with the first carrier and the third ring gear being connected together as a unit to form a first rotating member and the second sun gear and the third carrier being connected together as a unit to form a second rotating member;
a first friction element arranged to selectively connect the first ring gear and the second carrier together;
a second friction element arranged to selectively connect the input shaft and the third sun gear together;
a third friction element arranged to selectively connect the first sun gear and the second carrier together;
a fourth friction element arranged to selectively connect the first sun gear and the second rotating member together; and
a fifth friction element arranged to selectively connect the first rotating member and the input shaft together,
the first to fifth friction elements being operatively arranged with respect to the first, second and third planetary gear units to selectively establish at least six forward speeds and one reverse speed by combining simultaneous engagement of three out of the first to fifth friction elements for transmitting torque from the input shaft to the output shaft.

2. The automatic transmission as claimed in claim 1, wherein
the first to fifth friction elements are further arranged to establish the reverse speed by simultaneously engaging the second friction element, the third friction element and the fourth friction element.

3. The automatic transmission as claimed in claim 2, wherein
the first to fifth friction elements are further arranged to establish the at least six forward speeds by establishing at least six of seven engagements as follows
simultaneously engaging the first friction element, the second friction element and the third friction element to establish one of the at least six forward speeds;
simultaneously engaging the first friction element, the second friction element, and the fourth friction element to establish one of the at least six forward speeds;
simultaneously engaging the first friction element, the second friction element, and the fifth friction element to establish one of the at least six forward speeds;
simultaneously engaging the first friction element, the fourth friction element, and the fifth friction element to establish one of the at least six forward speeds;
simultaneously engaging the second friction element, the fourth friction element, and the fifth friction element to establish one of the at least six forward speeds;
simultaneously engaging the second friction element, the third friction element, and the fifth friction element to establish one of the at least six forward speeds; and
simultaneously engaging the third friction element, the fourth friction element, and the fifth friction element to establish one of the at least six forward speeds.

4. The automatic transmission as claimed in claim 1, wherein
the first to fifth friction elements are further arranged to establish the at least six forward speeds by establishing at least six of seven engagements as follows
simultaneously engaging the first friction element, the second friction element and the third friction element to establish one of the at least six forward speeds;
simultaneously engaging the first friction element, the second friction element, and the fourth friction element to establish one of the at least six forward speeds;
simultaneously engaging the first friction element, the second friction element, and the fifth friction element to establish one of the at least six forward speeds;

simultaneously engaging the first friction element, the fourth friction element, and the fifth friction element to establish one of the at least six forward speeds;

simultaneously engaging the second friction element, the fourth friction element, and the fifth friction element to establish one of the at least six forward speeds;

simultaneously engaging the second friction element, the third friction element, and the fifth friction element to establish one of the at least six forward speeds; and simultaneously engaging the third friction element, the fourth friction element, and the fifth friction element to establish one of the at least six forward speeds.

5. An automatic transmission comprising:

an input shaft;

an output shaft;

a first planetary gear unit including a first sun gear, a first carrier supporting a first pinion in meshed engagement with the first sun gear, and a first ring gear in meshed engagement with the first pinion;

a second planetary gear unit including a second sun gear, a second carrier supporting a second pinion in meshed engagement with the second sun gear, and a second ring gear in meshed engagement with the second pinion, with the output shaft always being connected to the second carrier;

a third planetary gear unit including a third sun gear, a third carrier supporting a third pinion in meshed engagement with the third sun gear, and a third ring gear in meshed engagement with the third pinion, with the input shaft always being connected to the third carrier, the first sun gear and the third sun gear being connected together as a unit to form a first rotating member and the first ring gear and the second sun gear being connected together as a unit to form a second rotating member; and a first friction element arranged to selectively stop rotation of the second ring gear;

a second friction element arranged to selectively connect the first carrier and the third carrier together;

a third friction element arranged to selectively stop rotation of the third ring gear;

a fourth friction element arranged to selectively connect the first carrier and the third ring gear together; and a fifth friction element arranged to selectively connect the second ring gear and the first rotating member, the first to fifth friction elements being operatively arranged with respect to the first, second and third planetary gear units to selectively establish at least six forward speeds and one reverse speed by combining simultaneous engagement of three out of the first to fifth friction elements for transmitting torque from the input shaft to the output shaft.

6. The automatic transmission as claimed in claim 5, wherein the first to fifth friction elements are further arranged to establish the reverse speed by simultaneously engaging the first friction element, the third friction element, and the fourth friction element.

7. The automatic transmission as claimed in claim 6, wherein the first to fifth friction elements are further arranged to establish the at least six forward speeds by establishing at least six of seven engagements as follows simultaneously engaging the first friction element, the second friction element and the third friction element to establish one of the at least six forward speeds;

simultaneously engaging the first friction element, the second friction element, and the fourth friction element to establish one of the at least six forward speeds;

simultaneously engaging the first friction element, the second friction element, and the fifth friction element to establish one of the at least six forward speeds;

simultaneously engaging the first friction element, the fourth friction element, and the fifth friction element to establish one of the at least six forward speeds;

simultaneously engaging the second friction element, the fourth friction element, and the fifth friction element to establish one of the at least six forward speeds;

simultaneously engaging the second friction element, the third friction element, and the fifth friction element to establish one of the at least six forward speeds; and simultaneously engaging the third friction element, the fourth friction element, and the fifth friction element to establish one of the at least six forward speeds.

8. The automatic transmission as claimed in claim 5, wherein the first to fifth friction elements are further arranged to establish the at least six forward speeds by establishing at least six of seven engagements as follows simultaneously engaging the first friction element, the second friction element and the third friction element to establish one of the at least six forward speeds;

simultaneously engaging the first friction element, the second friction element, and the fourth friction element to establish one of the at least six forward speeds;

simultaneously engaging the first friction element, the second friction element, and the fifth friction element to establish one of the at least six forward speeds;

simultaneously engaging the first friction element, the fourth friction element, and the fifth friction element to establish one of the at least six forward speeds;

simultaneously engaging the second friction element, the fourth friction element, and the fifth friction element to establish one of the at least six forward speeds;

simultaneously engaging the second friction element, the third friction element, and the fifth friction element to establish one of the at least six forward speeds; and simultaneously engaging the third friction element, the fourth friction element, and the fifth friction element to establish one of the at least six forward speeds.

9. An automatic transmission comprising:

an input shaft;

an output shaft;

a first planetary gear unit including a first sun gear, a pair of first pinions in meshed engagement with each other, a first carrier supporting a first of the first pinions in meshed engagement with the first sun gear and a first ring gear in meshed engagement with a second of the first pinions, with the first sun gear always being fixed;

a second planetary gear unit including a second sun gear, a second carrier supporting a second pinion in meshed engagement with the second sun gear, and a second ring gear in meshed engagement with the second pinion, with the output shaft always being connected to the second ring gear;

a third planetary gear unit including a third sun gear, a third carrier supporting a third pinion in meshed engagement with the third sun gear, and a third ring gear in meshed engagement with the third pinion, with the input shaft always being connected to the third sun gear and the second sun gear and the third carrier being connected together as a unit to form a rotating member;

a first friction element arranged to selectively connect the first ring gear and the second carrier together;

a second friction element arranged to selectively connect the first carrier and the rotating member together;

a third friction element arranged to selectively connect the first ring gear and the third ring gear together;

a fourth friction element arranged to selectively connect the first carrier and the third ring gear together; and a fifth friction element arranged to selectively connect the second carrier and the third sun gear together, the first to fifth friction elements being operatively arranged with respect to the first, second and third planetary gear units to selectively establish at least six forward speeds and one reverse speed by combining simultaneous engagement of three out of the first to fifth friction elements for transmitting torque from the input shaft to the output shaft.

10. The automatic transmission as claimed in claim 9, wherein the first to fifth friction elements are further arranged to establish the reverse speed by simultaneously engaging the first friction element, the third friction element, and the fourth friction element.

11. The automatic transmission as claimed in claim 10, wherein the first to fifth friction elements are further arranged to establish the at least six forward speeds by establishing at least six of seven engagements as follows simultaneously engaging the first friction element, the second friction element and the third friction element to establish one of the at least six forward speeds;

simultaneously engaging the first friction element, the second friction element, and the fourth friction element to establish one of the at least six forward speeds;

simultaneously engaging the first friction element, the second friction element, and the fifth friction element to establish one of the at least six forward speeds;

simultaneously engaging the first friction element, the fourth friction element, and the fifth friction element to establish one of the at least six forward speeds;

simultaneously engaging the second friction element, the fourth friction element, and the fifth friction element to establish one of the at least six forward speeds;

simultaneously engaging the second friction element, the third friction element, and the fifth friction element to establish one of the at least six forward speeds; and simultaneously engaging the third friction element, the fourth friction element, and the fifth friction element to establish one of the at least six forward speeds.

12. The automatic transmission as claimed in claim 9, wherein the first to fifth friction elements are further arranged to establish the at least six forward speeds by establishing at least six of seven engagements as follows simultaneously engaging the first friction element, the second friction element and the third friction element to establish one of the at least six forward speeds;

simultaneously engaging the first friction element, the second friction element, and the fourth friction element to establish one of the at least six forward speeds;

simultaneously engaging the first friction element, the second friction element, and the fifth friction element to establish one of the at least six forward speeds;

simultaneously engaging the first friction element, the fourth friction element, and the fifth friction element to establish one of the at least six forward speeds;

simultaneously engaging the second friction element, the fourth friction element, and the fifth friction element to establish one of the at least six forward speeds;

simultaneously engaging the second friction element, the third friction element, and the fifth friction element to establish one of the at least six forward speeds; and simultaneously engaging the third friction element, the fourth friction element, and the fifth friction element to establish one of the at least six forward speeds.

* * * * *